Figure 1:
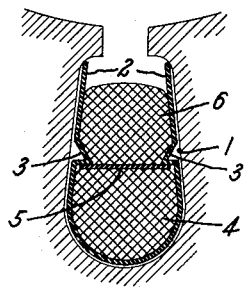

May 23, 1950           O. WIRTH           2,508,850

WINDING SLOT INSULATION FOR ELECTRODYNAMIC MACHINES

Filed Dec. 23, 1947

Inventor

Otto Wirth

By Pierce, Scheffler & Parker,

Attorneys.

Patented May 23, 1950

2,508,850

UNITED STATES PATENT OFFICE 2,508,850

WINDING SLOT INSULATION FOR ELECTRODYNAMIC MACHINES

Otto Wirth, Zurich, Switzerland, assignor to Micafil Ltd., Works for Electrical Insulation and Winding Machines, Zurich, Switzerland, a joint-stock company of Switzerland Application December 23, 1947, Serial No. 793,364
In Switzerland January 2, 1947

2 Claims. (Cl. 171—206)

This invention relates to winding slot insulation for electrodynamic machines, and particularly to novel insulating arrangements for the stator windings of such machines.

As is well known, the stators of small power electric motors are wound with wire coils, and for this purpose the winding slots of the stator must first be provided with a slot insulation. This slot insulation consists of a strip of insulating material, such as pressboard or the like faced with oiled cloth or oiled silk, which strip is cut to the length of the winding slot and is pushed into the latter in such a manner as to assume a U-shaped configuration and to cover the whole inner face of the slot.

In the process of winding the stator, whether this is performed manually or by means of a machine, the necessary number of turns of wire are laid into the slot of the stator through the throat opening of the slot and are eventually locked in position. As long as only one coil is arranged in each slot, no difficulties are encountered in the performance of the winding process, but this no longer applies when two half-coils or even more component coils are to be wound into each slot. These half or component coils are laid into the slot one upon the other, and it has been found that the coil or coils already in the slot have a tendency to expand so as to form an obstacle to the winding of the next component coil unless the wires of the coil or coils already wound are held together in some way.

The invention has for its object to eliminate the said drawback by preventing the displacement of the turns of each component coil upon the completion of the winding of that coil. An object is to provide slot insulation including an axially disposed partition member of insulating material between adjacent component coils, the partition member being guided into and anchored in the winding slot of the stator in such a manner that the component coil or coils already wound are locked in position.

The invention will now be described in further detail with reference to the drawing in which Figs. 1-4 inclusive are fragmentary transverse cross-sections through stator slots in which are arranged different forms of slot insulation embodying the invention.

In all the figures of the drawing, a winding slot 1 of the stator of an electric motor is shown in cross-sectional view.

In the embodiment illustrated in Fig. 1, a winding slot insulation 2 is inserted in the winding slot 1 of the stator in conventional manner. This winding slot insulation consists of a precut strip of insulating material, such as pressboard faced with oiled cloth, which strip is provided, in the course of its production, with two pressed-up longitudinal ribs 3. The winding strip 2 is so bent for insertion in the slot as to assume the desired U-shaped configuration in conformity with the shape of the slot and thereafter to be firmly held in the slot 1 by engagement with the walls of the latter. Now, if the slot is to be filled with two half-coils, the first half coil 4 is first wound into the slot and, when the winding of this coil 4 is completed, a narrow flat strip 5 of insulating material is slid in under the ribs 3 so as to lock the half-coil 4 in position. The length of the insulating member 5 corresponds to the axial length of the slot. The second half-coil 6 can now be wound smoothly, without coming into contact with the first coil or suffering inconvenience from the latter in any respect. In other words, the necessary winding space for the second half-coil 6 will always be free. To enable the wires to slide smoothly into the root or inner portion of the slot, it is advantageous to incline the outer flanks of the ribs 3, i. e. those facing the throat opening of the slot, towards the root of the slot.

Figure 2:
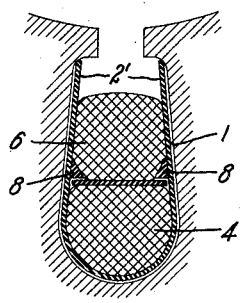

In the embodiment of Fig. 2, the holding ribs for the partition member 5 are not constructed as integral portions of the winding slot insulation 2', but as separate ribs 8 or bars of insulating material, and preferably of triangular cross-section, cemented to the winding slot insulation 2'.

Figure 3:
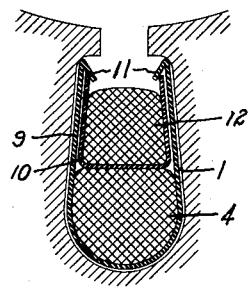

The embodiment of Fig. 3 differs from the embodiments so far described in that the partition member for the component coils is constructed in the form of a U-shaped insulating sleeve. After the wires of the first component coil 4 have been wound into the slot 1 which is lined with a strip of insulation 9, a U-shaped partition member 10 of insulating material is slid into the slot 1 above the coil 4. This partition member 10, which extends in the whole length of the winding slot, is held in position by means of the two top edges 11 of the insulating member 9, the said edges being bent inwards in hook-like configuration so as to form a guide for the partition member 10. Following this, the other component coil 12 is wound into the winding slot 1 above the partition member 10. This arrangement can only be used in such cases where sufficient winding space is available in the slot for the additional thickness of insulation.

Figure 4:
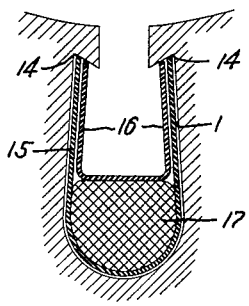

Instead of constructing the winding slot insulation with hooklike edges for engagement with the partition member, it is also possible to punch the slots of the stator laminations with sharp undercut corners which serve the same purpose as the reversely bent edges of the insulating strip 9. Such a construction is shown in Fig. 4 as comprising undercut edge flanges or corners 14 for the slot which anchor both the winding slot insulation 15 and the U-shaped partition member 16 which is slid into the winding slot after the first component coil 17 has been wound. Neither the winding slot insulation 15 nor the U-shaped partition member 16 can escape in the direction of the throat opening of the slot so as to displace the wire to a wrong position.

While the invention has been described more particularly in its application to stator windings with two component coils, it goes without saying that the invention is by no means limited to the provision of only two component coils per winding slot. In cases where it is desired to subdivide the winding into more than two component coils, a partition member of insulating material may be provided in the manner described for each additional coil so that each component coil is locked in the winding space allotted thereto.

I claim:

1. Winding slot insulation for stators of electrodynamic machines of the type in which component coils are wound in superposed relation in the stator slots; said insulation comprising a U-shaped strip of insulation lining the stator slot and upon which the first component coil is wound, an axially disposed partition member of insulating material to lock the wound component coil in place, and longitudinally extending ribs projecting inwardly of the slot from the opposite sides thereof to guide the partition member during insertion axially of the slot and to anchor the same in place within the slot, the faces of said ribs towards the throat of the slot being inclined towards the root of the slot.

2. Winding slot insulation for stators of electrodynamic machines of the type in which component coils are wound in superposed relation in the stator slots; said insulation comprising a U-shaped strip of insulation lining the stator slot and upon which the first component coil is wound, an axially disposed partition member of insulating material to lock the wound component coil in place, and longitudinally extending ribs pressed in side walls of said U-shaped strip and projecting inwardly of the slot to guide the partition member during insertion axially of the slot and to anchor the same in place within the slot.

OTTO WIRTH.

REFERENCES CITED

The following references are of record in the file of this patent:

UNITED STATES PATENTS

| Number | Name | Date |
|---|---|---|
| 1,320,795 | Pearson | Nov. 4, 1919 |
| 1,486,874 | Frederick | Mar. 18, 1924 |
| 2,252,440 | Safford | Aug. 12, 1941 |